(12) United States Patent
Muylaert et al.

(10) Patent No.: US 7,926,759 B2
(45) Date of Patent: Apr. 19, 2011

(54) TAIL ROTOR HUB

(75) Inventors: Neal W. Muylaert, Apache Junction, AZ (US); Lyndon C. Lamborn, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 11/946,817

(22) Filed: Nov. 28, 2007

(65) Prior Publication Data

US 2009/0136351 A1     May 28, 2009

(51) Int. Cl.
     *B64C 11/12*     (2006.01)
(52) U.S. Cl. .................. 244/17.21; 416/134 A; 416/138
(58) Field of Classification Search ............... 244/17.19, 244/17.21, 17.11, 17.25; 416/136, 134 A, 416/138, 141
See application file for complete search history.

(56) References Cited

U.S. PATENT DOCUMENTS

| | | | | |
|---|---|---|---|---|
| 2,534,353 A * | 12/1950 | Hiller, Jr et al. | ................ | 416/18 |
| 4,281,966 A * | 8/1981 | Duret et al. | ............... | 416/134 A |
| 5,383,767 A * | 1/1995 | Aubry | ....................... | 416/134 A |
| 5,415,525 A * | 5/1995 | Desjardins et al. | ........ | 416/168 R |
| 5,431,540 A * | 7/1995 | Doolin et al. | ............. | 416/168 R |

* cited by examiner

*Primary Examiner* — Joshua J Michener
*Assistant Examiner* — Brian M O'Hara
(74) *Attorney, Agent, or Firm* — Lee & Hayes, PLLC

(57) ABSTRACT

A tail rotor hub system and methods are disclosed. In one embodiment, the system includes a helicopter fuselage connected to a tail rotor assembly that holds tail blades. The assembly includes an elongated tail rotor housing and an elongated blade root fitting that rotates within the housing. A tension torsion strap is connected at one end to the housing and is connected at its other end to the blade root fitting to hold the blade root fitting in the housing when the housing rotates. Coupled between outside walls of the blade root fitting and inside walls of the housing are self lubricating bearings to enable the blade root fitting to rotate within the housing to change the pitch of the tail blades.

20 Claims, 4 Drawing Sheets

TAIL ROTOR HUB

FIELD OF THE INVENTION

The field of the present disclosure relates to a helicopter tail rotor hub, and more specifically, to a helicopter tail rotor hub and methods for controlling a pitch of a helicopter tail blade using the tail rotor hub.

BACKGROUND OF THE INVENTION

Existing tail rotor hub design on the certain helicopters tail rotors increase vibration. Also the bearings used with existing tail rotors result in the tail rotor blade moment and centrifugal force (C/F) loads that are functionally incompatible. These bearings are located in close proximity and could result in an unstable short bearing couple. Additionally the existing hub design is very difficult to assemble and maintain primarily due to the current cage less C/F retention bearing design. Existing tail blades are integrally attached to the tail rotor requiring a customized tooling to manufacture the rotor/blade combination. Although desirable results have been achieved using prior art systems and methods, novel systems and methods that mitigate the above-noted undesirable characteristics would have utility.

SUMMARY

Technology systems and methods in accordance with the teachings of the present disclosure may advantageously provide an improved tail rotor assembly for adjusting the pitch of a rotor blade.

In one embodiment, a system includes a helicopter fuselage and a tail rotor assembly connected to the fuselage. The rotor assembly includes an elongated tail rotor housing including a first tailblade end and a second tailblade end lying in a plane. The housing rotates about a first axis that extends perpendicular to the plane and extends through a center of the housing between the tailblade ends. An elongated blade root fitting is disposed within the housing and rotates about a second axis lying in the plane and extending perpendicular to the first axis along a length of the fitting. A tension torsion strap is connected at one end to the housing and at the other end to the blade root fitting to hold the blade root fitting in the housing when the blade root fitting rotates about the second axis. A tail rotor blade retention system including a self lubricating bearing is coupled between outside walls of the blade root fitting and inside walls of the housing to enable the blade root fitting to rotate about the second axis within the housing.

In another embodiment, the tail rotor assembly includes an elongated tailrotor housing having a first tailblade end and a second tailblade end lying in a plane. The housing rotates about a first axis extending perpendicular to the plane and through a center of the housing between the tailblade ends. An elongated blade root fitting is contained within the housing and rotates about a second axis extending in the plane and perpendicular to the first axis along a length of the fitting. A tension torsion strap is connected to the housing and the blade root fitting to hold the blade root fitting in the housing when the blade root fitting rotates about the second axis. A tail rotor blade retention system, including a self lubricating bearing, is coupled between the blade root fitting and the housing to enable the blade root fitting to rotate about the second axis within the housing.

In another embodiment, a method includes providing the elongated tailrotor housing having a first tailblade end and a second tailblade end. Elongated blade root fittings are contained within the housing and tail blades are attached to the blade root fittings at each end of the housing. The housing is rotated about a first axis extending perpendicular to the plane and through a center of the housing between the tailblade ends to rotate the tail blades. The elongated blade root fitting is rotated about a second axis extending in the plane and perpendicular to the first axis along a length of the fitting. A tension torsion strap is connected to the housing and to the blade root fitting to hold the blade root fitting in the housing when the blade root fitting rotates about the second axis. A tail rotor blade retention system, including a self lubricating bearing, is connected between the blade root fitting and the housing so that the blade root fitting to rotates about the second axis within the housing while the tail blades rotate to change the pitch of the tail blades.

The features, functions, and advantages that have been above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure teaches tail rotor hub technology and methods. Many specific details of certain embodiments of the invention are set forth in the following description and in FIGS. 1-4 to provide a thorough understanding of such embodiments. One skilled in the art will understand, however, that the invention may have additional embodiments, or that the invention may be practiced without several of the details described in the following description.

Figure 1:
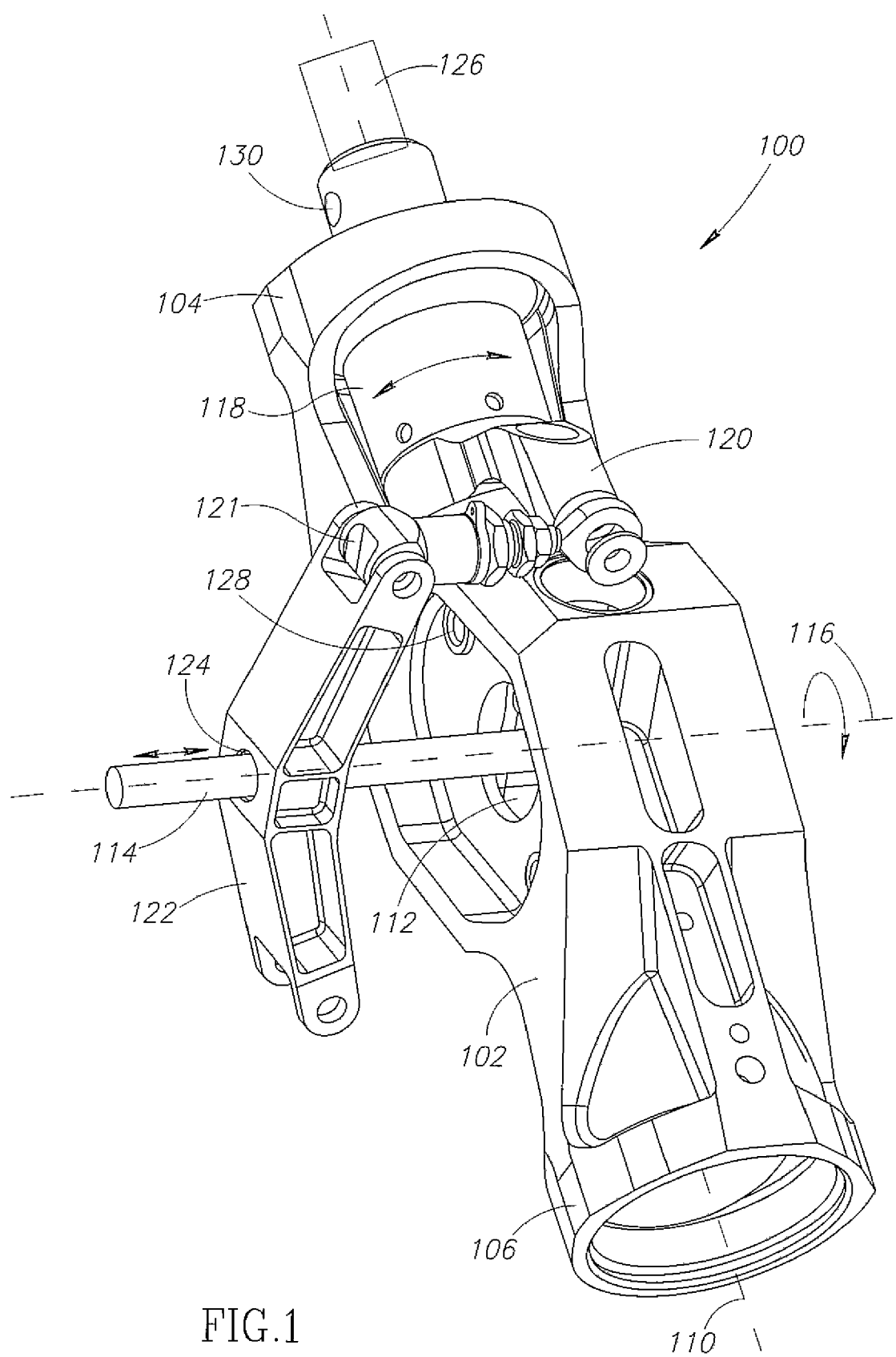
FIG. 1 is a side isometric view of a tail rotor hub in accordance with an embodiment of the invention.

Shown in FIG. 1 is a tail rotor hub assembly 100 having an elongated tailrotor housing 102 having a first tailblade end 104 and a second tailblade end 106 lying in the same plane. Extending through trailrotor housing 102 in the plane is axis 110. In a center of housing 102, between tailblade ends 104 and 106, is an aperture 112 through which radial shaft 114 extends. Extending along the length of shaft 114 and perpendicular to the plane of the first tailblade end and the second tailblade end is axis 116. Shaft 114 is connected at one end to a tail rotor control system (not shown) on a helicopter or other aircraft and is attached at its other end to the pitch control arm 122.

Disposed within housing 102 and extending along axis 110 is elongated hollow blade root fitting 118. More details of the blade root fitting 118 are described in FIG. 3. Blade root fitting 118 includes an integral pitch horn 120. Coupled to integral pitch horn 120 via bearing knuckle 121 is the pitch control arm 122 having an aperture 124 aligned with axis 116 extending through the housing 102. Shaft 114 extends through and is attached to the pitch control arm 122 via the aperture 124. Blade root fitting 118 is connected at one end to a helicopter tail blade 126 and is held in housing 102 by a tension torsion strap 202 (FIG. 2).

Figure 2:
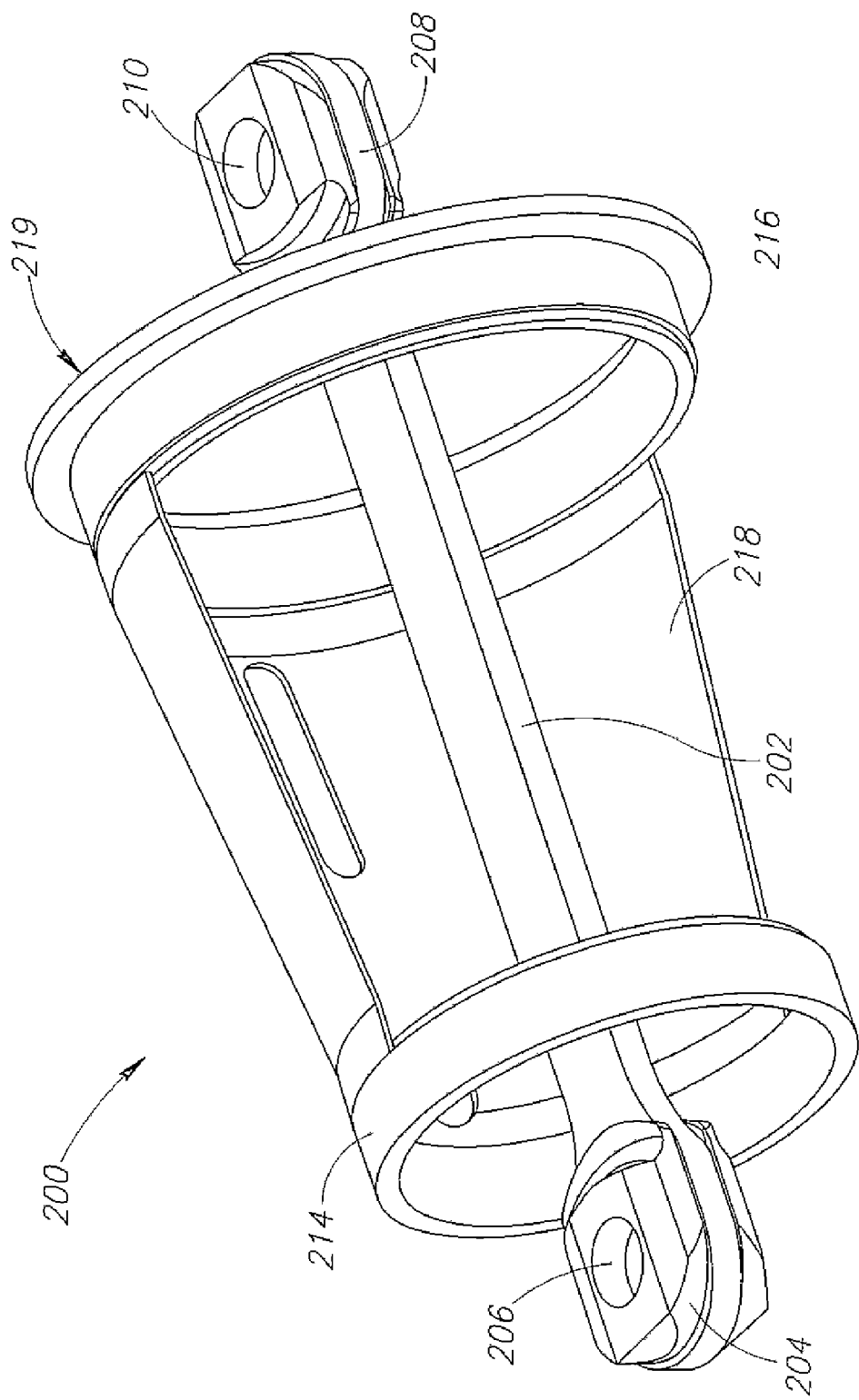
FIG. 2 is an enlarged isometric view of a tail rotor blade retention system used in the tail rotor hub.

Shown in FIG. 2 is a tension torsion strap 202 disposed within a tail rotor blade retention system 200 and blade root fitting 118. A bolt (not shown) extends through aperture 128 (FIG. 1) in housing 102 and aperture 206 at end 204 in torsion strap 202. Another bolt (not shown) extends through aperture 130 (FIG. 1) in blade root fitting 118 and aperture 210 at end 208 of torsion strap 202.

Shown in FIG. 2 is a tail rotor blade retention system 200 that includes self lubricating bearings 214 and 216. Bearings 214 and 216 outer surface are attached to the inside walls of housing 102. The inner surface of bearings 214 and 216 is constructed with a self lubricating material and contacts the outer surface of blade root fitting 118. A retention sleeve 218 that partially extends around blade root fitting 118 holds the bearings 214 and 216 in place, the entire assembly being retained with a snap ring 219.

Figure 3:
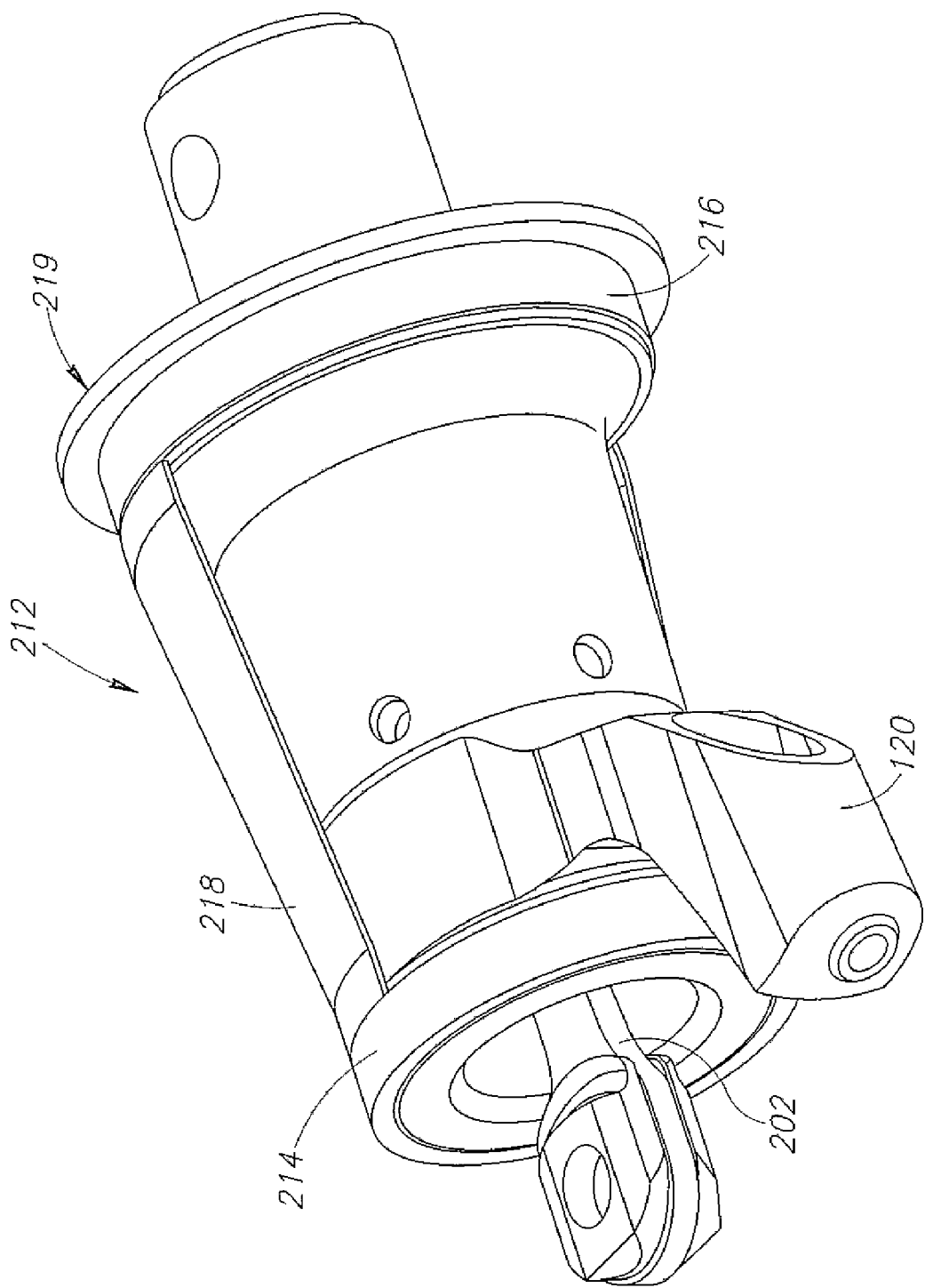
FIG. 3 is an enlarged isometric view of a retention strap on a blade root fitting used in the tail rotor hub.

Shown in FIG. 3 is the retention system 212 with bearings 214 and 216 being held in place on blade root fitting 118. Integral pitch horn 120 extends out from blade root fitting 118 between bearings 214 and 216. Tension torsion strap 202 is disposed within blade root fitting 118.

Figure 4:
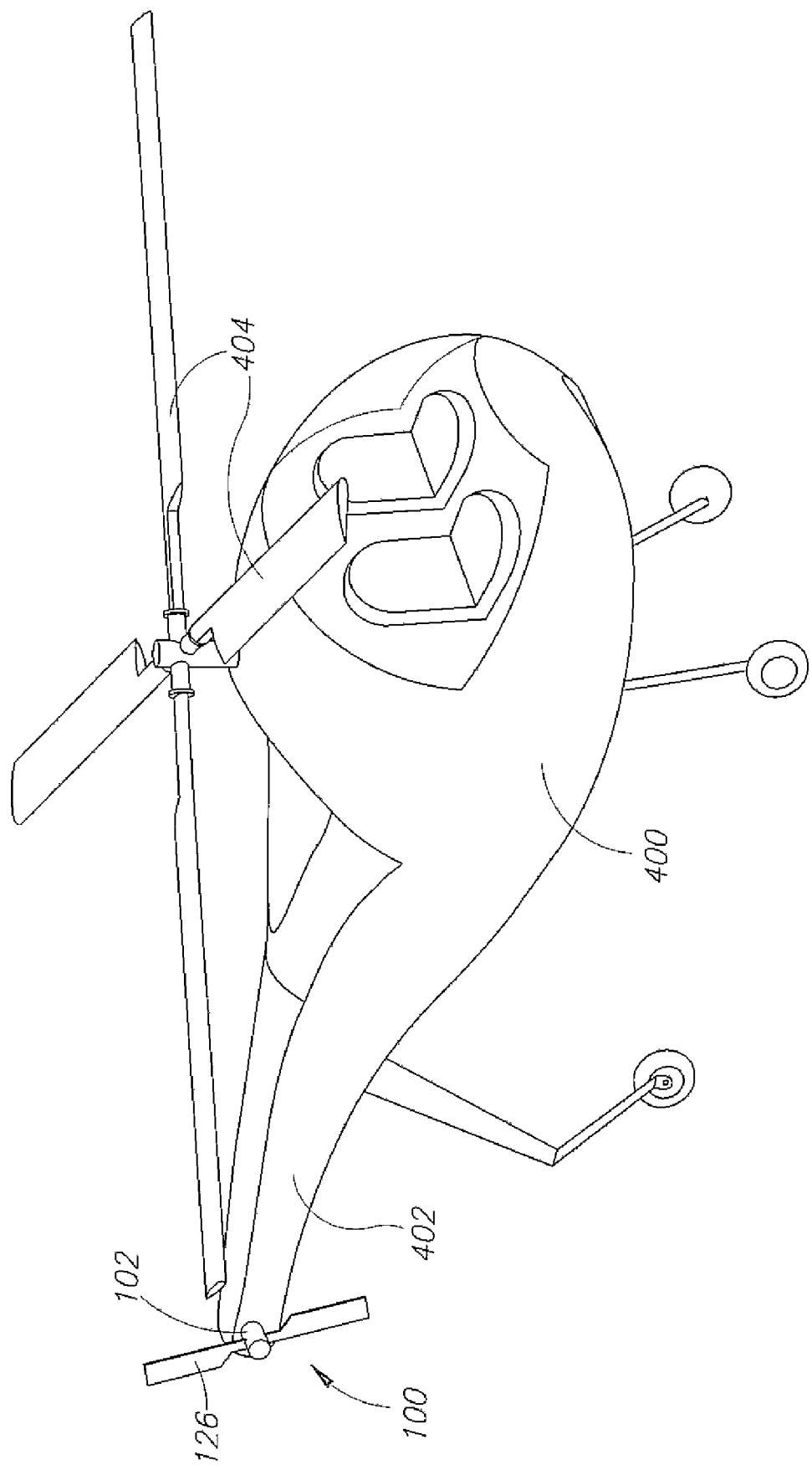
FIG. 4 is a front isometric view of a tail rotor hub on a helicopter in accordance with an embodiment of the invention

Shown in FIG. 4 is helicopter 400 having a fuselage 402, top rotors 404 and a tail rotor hub assembly 100. Assembly 100 includes housing 102 with tail blades 126 disposed on the rear of the aircraft.

Referring to FIGS. 1 and 4, during operation of the helicopter 400, the rear helicopter drive shaft (not shown) turns housing 102, blade root fitting 118 and helicopter tail blades 126 so that they rotates about axis 116 (FIG. 1). The elongated blade root fitting 118 rotates about axis 110. Tension torsion strap 202 holds the blade root fitting 118 in the housing 102 when the blade root fitting 118 rotates about axis 110. Although housing 102 is shown with one root fitting 118 and one tail blade, in one embodiment housing 102 may have two blade root fittings 118 and tail blades 126 as associated hardware at each end of housing 102.

Shaft 114 is actuated by the tail rotor control system (not shown) in the tail of the helicopter. Shaft 114 is moved into and out of the housing 102 by the motor resulting in the control arm 122 moving away from or toward the housing. In response to the control arm 122 moving its position, the integral pitch horn 120 and blade root fitting 118 rotate to adjust the pitch of the tail blades 126. In one embodiment, the angle of rotation of the blade root fitting is +/−15 degrees. Tension torsion strap 202 twists when blade root fitting 118 rotates. The tail rotor blade retention system 212 has bearings 214 and 216 made from a material that is self lubricating to enable the blade root fitting 118 to rotate about axis 110 within the housing 102.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A helicopter comprising:
    a helicopter fuselage; and
    a tail rotor assembly coupled with the fuselage, the assembly comprising:
       an elongated tail rotor housing including a first tail blade end and a second tail blade end lying in a plane, the elongated tail rotor housing operative to rotate about a first axis, the first axis extending perpendicular to the plane and extending through a center of the elongated tail rotor housing between the first tail blade end and the second tail blade end;
       a blade root fitting disposed within the elongated tail rotor housing and operative to rotate about a second axis lying in the plane and extending perpendicular to the first axis along a length of the blade root fitting, the blade root fitting including a pitch horn;
       a tension torsion strap coupled at one end to the elongated tail rotor housing and at an opposite end to the blade root fitting;
       a tail rotor blade retention system including two self lubricating bearings coupled between an outside wall of the blade root fitting and an inside wall of the elongated tail rotor housing, the pitch horn extending outwardly from the blade root fitting between the two self lubricating bearings through an aperture in the inside wall of the elongated tail rotor housing.

2. The helicopter of claim 1 further comprising a tail blade coupled to an end of the blade root fitting.

3. The helicopter as recited in claim 1 further comprising:
    a tail blade coupled to an end of the blade root fitting;
    a pitch control arm coupled with the pitch horn, the pitch control arm having an aperture aligned with the first axis extending through the elongated tail rotor housing;
    a radial shaft coupled to the pitch control arm, the radial shaft extending along the first axis through the aperture into the elongated tail rotor housing, the radial shaft operative to move into and out of the elongated tail rotor housing to rotate the pitch horn and blade root fitting and adjust a pitch of the tail blade.

4. The helicopter as recited in claim 3 wherein the tension strap twists when the blade root fitting rotates.

5. The helicopter as recited in claim 2 wherein the two self lubricating bearings are coupled with a retention sleeve and snap ring.

6. The helicopter as recited in claim 2 further comprising a second blade root fitting disposed in the elongated tail rotor housing, and a second tail blade tail blade coupled to an end of the second blade root fitting.

7. The helicopter as recited in claim 2 wherein an outside wall of the two self lubricating bearings is fixedly attached to the inside wall of the elongated tail rotor housing, and wherein the blade root fitting rotates about the inside wall of the bearing.

8. A tail rotor assembly, comprising:
    an elongated tail rotor housing having a first tail blade end and a second tail blade end lying in a plane, the elongated tail rotor housing operative to rotate about a first axis extending perpendicular to the plane and through a center of the elongated tail rotor housing between the tail blade ends;
    a blade root fitting contained within the elongated tail rotor housing and operative to rotate about a second axis extending in the plane and perpendicular to the first axis along a length of the blade root fitting, the blade root fitting including a pitch horn located at an end of the blade root fitting closest to the center of the housing, the pitch horn extending outwardly from the blade root fitting between two self lubricating bearings through an aperture of an interior wall of the elongated tail rotor housing;
    a tension torsion strap coupled to the elongated tail rotor housing and the blade root fitting; and
    a tail rotor blade retention system including the self lubricating bearings coupled between the blade root fitting and the elongated tail rotor housing.

9. The tail rotor assembly of claim 8 further comprising a tail blade coupled to one end of the blade root fitting.

10. The tail rotor assembly as recited in claim 8 further comprising:
   a tail blade coupled to one end of the blade root fitting;
   a pitch control arm coupled with the pitch horn, the pitch control arm having an aperture aligned with the first axis extending through the elongated tail rotor housing;
   a radial shaft coupled to the pitch control arm, the radial shaft extending along the first axis through the aperture in the pitch control arm into the elongated tail rotor housing, the radial shaft operative to move into and out of the elongated tail rotor housing such that when the radial shaft moves the changes position toward and away from the elongated tail rotor housing to turn the pitch horn and blade root fitting to adjust a pitch of the tail blade.

11. The tail rotor assembly as recited in claim 10 wherein the tension strap twists when the blade root fitting rotates.

12. The assembly as recited in claim 8 wherein the tail rotor retention system includes a second bearing coupled to the first bearing with a retention sleeve.

13. The assembly as recited in claim 9 further comprising a second blade root fitting disposed in the elongated tail rotor housing, and a second tail blade coupled to an end of the second blade root fitting.

14. The assembly as recited in claim 8 wherein an outside wall of the self lubricating bearings is fixedly attached to an inside wall of the elongated tail rotor housing, and wherein the blade root fitting rotates about an inside wall of the self lubricating bearings.

15. A method of changing a pitch of a tail blade, comprising:
   providing an elongated tail rotor housing having a first tail blade end and a second tail blade end lying in a plane;
   containing a blade root fitting within the elongated tail rotor housing;
   attaching a tail blade to the blade root fitting at an end of the elongated tail rotor housing;
   rotating the elongated tail rotor housing about a first axis extending perpendicular to the plane and through a center of the elongated tail rotor housing between the first tail blade end and the second tail blade end to rotate the tail blade;
   rotating the blade root fitting about a second axis extending in the plane and perpendicular to the first axis along a length of the blade root fitting;
   connecting a tension torsion strap to the elongated tail rotor housing and the blade root fitting to hold the blade root fitting in the elongated tail rotor housing when the blade root fitting rotates about the second axis; and
   coupling a tail rotor blade retention system including self lubricating bearings between the blade root fitting and the elongated tail rotor housing so that the blade root fitting rotates about the second axis within the elongated tail rotor housing while the tail blade rotates to change a pitch angle of the tail blade; and
   connecting a pitch horn to the blade root fitting between the self lubricating bearings, and extending the pitch horn through an aperture of an interior wall of the elongated tail rotor housing.

16. The method as recited in claim 15 further comprising:
   coupling a pitch control arm with the pitch horn;
   aligning an aperture in the pitch control arm with the first axis extending through the elongated tail rotor housing;
   connecting a radial shaft to the pitch control arm,
   extending the radial shaft along the first axis extending through the aperture in the pitch control arm into the elongated tail rotor housing,
   moving the radial shaft into and out of the elongated tail rotor housing such that when the radial shaft moves the pitch control arm moves to turn the horn and the blade root fitting thereby adjusting the pitch angle of the tail blade.

17. The method as recited in claim 15 further comprising twisting the tension strap when the blade root fitting rotates.

18. The method as recited in claim 15 wherein the self lubricating bearings have an inside wall and an outside wall, wherein the method further comprises:
   fixedly attaching the outside wall of the self lubricating bearing to an inside wall of the elongated tail rotor housing, and
   rotating the blade root fitting about the inside wall of the self lubricating bearing.

19. The method as recited in claim 18 further comprising connecting the self lubricating bearings with a retention sleeve and snap ring.

20. The method as recited in claim 15 wherein the tension torsion strap has a first end and a second end, and wherein the tension strap is coupled to the elongated tail rotor housing at the first end and the blade root fitting at the second end.

\* \* \* \* \*